March 3, 1936. O. J. CHINNOCK 2,032,684
METHOD AND APPARATUS FOR THE PRODUCTION OF NITRIC ACID FROM AMMONIA
Filed June 20, 1934
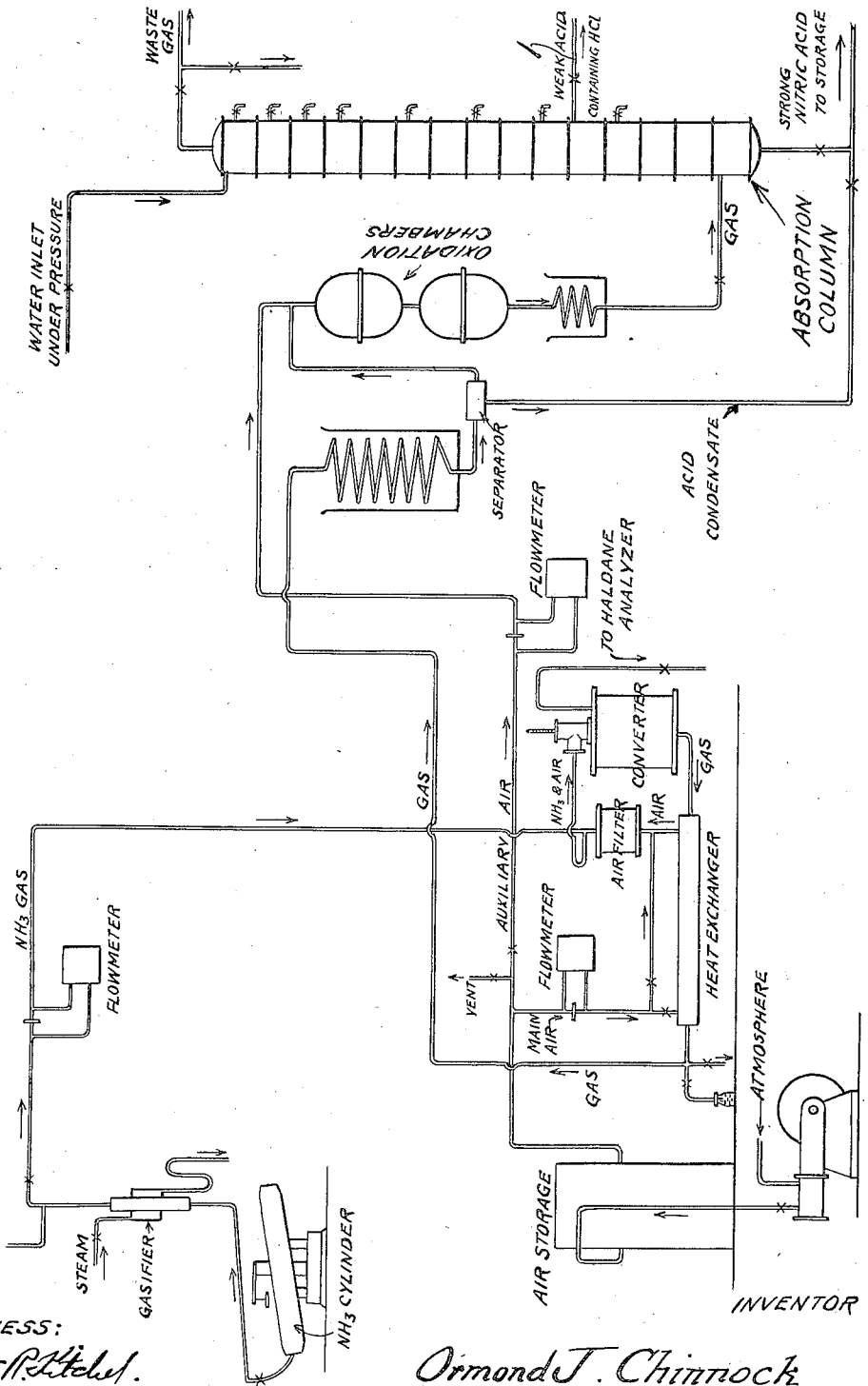

Patented Mar. 3, 1936

2,032,684

UNITED STATES PATENT OFFICE 2,032,684

METHOD AND APPARATUS FOR THE PRODUCTION OF NITRIC ACID FROM AMMONIA

Ormond J. Chinnock, Hercules, Calif., assignor to Hercules Powder Company, Wilmington, Del., a corporation of Delaware Application June 20, 1934, Serial No. 731,409

11 Claims. (Cl. 23—161)

This invention relates to a method and apparatus for the production of nitric acid from ammonia.

As is well known, in the production of nitric acid from ammonia, the ammonia gas is first catalytically oxidized to oxides of nitrogen, principally nitric oxide, and the oxides of nitrogen produced together with an excess of air, with which the nitric oxide reacts to form nitrogen dioxide, are subsequently absorbed in water to produce nitric acid. In the usual process for the production of nitric acid from ammonia, the gases, rich in nitric oxide, from the oxidation chambers in which the ammonia is oxidized, are passed under atmospheric or higher pressure together with an excess of air into an oxidation chamber, where additional air may be added if desired, and in which the nitric oxide is substantially oxidized to nitrogen dioxide. The nitrogen dioxide-containing gas mixture is then passed through an absorption column in counterflow with a current of water.

The water used in the absorption column will ordinarily contain varying amounts of chlorides dissolved therein. In certain localities the chloride concentration of the water which must be used for absorption may rise as high as 640 parts per million, and in nearly all parts of the country the feed water which is used will at least occasionally contain very appreciable amounts of dissolved chlorides. When water containing these dissolved chlorides is used for absorption of the oxides of nitrogen for the resultant production of nitric acid, hydrochloric acid is produced by the reaction between the nitric acid and the chlorides. Since the hydrochloric acid produced is not soluble in the strong nitric acid escaping from the absorption tower, the concentration thereof continually builds up in the absorption tower during operation. If operation is continued for a sufficient period of time, the concentration of hydrochloric acid in the absorption tower becomes sufficiently high to have a very corrosive effect upon the chrome steel usually used in fabricating these absorption towers.

It has accordingly been customary, in the operation of ammonia oxidation plants, to flush the absorption tower from time to time to free it from the hydrochloric acid contained therein. The flushing of the absorption tower is usually conducted by first shutting off or greatly reducing the flow of ammonia into the oxidation apparatus, and then flushing the absorption column with feed water under the usual pressure until the effluent from the absorption column shows substantially only that concentration of chlorides present in the feed water. Such flushing procedure is extremely disadvantageous for several reasons. In the first place, shutting off the flow of ammonia through the oxidation apparatus effects temperature changes of considerable magnitude in the catalytic converter and in the heat exchangers, etc., with resultant strain and damage to these units. It further entails production of a very large quantity of weak nitric acid which must be concentrated before use. For example, ordinarily the flushing treatment involves the production of from 4,000 to 6,000 pounds of weak nitric acid. The operation of the plant is also completely interrupted for a period of at least two hours.

Now, in accordance with this invention there have been devised a method and apparatus for the removal of hydrochloric acid from the absorption column without interrupting the production of strong nitric acid and without the necessity for shutting down or curtailing the flow of ammonia.

Apparatus for the production of nitric acid from ammonia in accordance with this invention is shown diagrammatically in the single figure of the accompanying drawing, in which the various conventional units are indicated by name.

It will be seen, by reference to the drawing, that the absorption column, which may be, for example, of the bubble cap type, is equipped with an inlet at the bottom for the entry of the nitrogen oxides and with an exit at the top for the waste gases. It is also provided with a feed water inlet at the top and a strong nitric acid discharge line at the bottom. In addition to these conventional features of an absorption column, there is added, in accordance with this invention, an additional discharge line, indicated in the drawing by the numeral 1, from an intermediate plate of the absorption column. This additional discharge line will be connected to that plate of the absorption column at which the hydrochloric acid concentration within the column will be at a maximum.

It has been found, in accordance with this invention, that the hydrochloric acid concentration maximum within the absorption column will occur at a point where the nitric acid concentration therein is within about the range 24–28%. The hydrochloric acid maximum will occur at this point because at higher concentrations of nitric acid, hydrogen chloride will be eliminated from the strong acid to be redissolved in the weaker nitric acid. Under normal operation 24-28% nitric acid concentration will occur at, for example, about the fifteenth plate of a forty plate absorption column. In such an absorption column, therefore, the weak acid discharge line will be connected to the fifteenth plate. In order to allow for variations in operating conditions, it may be advisable to provide branch connections, provided with suitable valves, from the weak acid discharge line to the plates immediately above and below the selected plate, so that acid may be drawn from any one of these plates. However, even if only a single connection is made, the feed water inflow can be so adjusted as to cause the hydrochloric acid maximum to be attained at the particular point selected.

In operation in accordance with this invention, absorption will be conducted in the usual manner in the absorption column with the weak acid discharge line I closed until the hydrochloric acid concentration has reached the upper limit of the tolerated concentration in the column, that is to say, for example, a concentration of 0.20%. The discharge line I will then be opened and the hydrochloric acid, together with the weak nitric acid, bled off from the column. At the same time, the water inflow will be increased to compensate for the amount of liquid removed through the weak acid discharge line. The time taken to reduce the hydrochloric acid concentration to a concentration equivalent to that of the chlorides in the feed water depends solely upon the rate at which the weak acid is bled from the column. A rate of about 250 pounds per hour represents, however, a practical maximum, since an increase from this rate to a rate of 500 pounds per hour does not effect a substantially increased rate of removal of hydrochloric acid. It is apparent that at the higher rates of bleeding the comparatively large excess of feed water added to compensate therefor causes excessive dilution of the hydrochloric acid at the point in the tower from which it is bled. If the concentration of hydrochloric acid is approximately 0.20% when the discharge line is opened and bleeding begun, the reduction in concentration to the desired degree can be accomplished in from four to six hours with the production of, at most, about 2800 pounds of weak nitric acid with a concentration of 26 to 28 per cent.

In contradiction to what might be expected, the excess of feed water admitted to compensate for the liquid bled off does not lower the concentration of strong nitric acid discharged from the bottom of the tower, nor does it cause loss of oxides of nitrogen in the waste gases escaping from the tower. During the bleeding procedure, the plates above the plate at which the bleeding takes place are, of course, substantially flooded with water. However, because of the fact that less weak acid passes down from the plate at which bleeding occurs, the concentration of acid on the plates below is actually increased. Thus, for example, while, under normal conditions of operation a 60 to 62 per cent. nitric acid would be discharged from the absorption column, during the bleeding operation a 65 per cent. nitric acid is discharged. While this stronger acid produced on the lower plates is not such an efficient absorbing medium for the nitrogen oxides as a weaker acid would be, nevertheless the increased dilution of the acid on the plates above that at which bleeding takes place effects increased absorption at these plates which entirely compensates for the decreased absorption on the lower plates. Accordingly, all of the nitrogen oxides passing into the tower, even during the bleeding operation, are substantially completely absorbed and the stack losses are no greater than under normal operation where no bleeding is practiced.

When the hydrochloric acid concentration in the absorption column has been reduced to the desired degree, the acid discharge line I will be closed and the excess feed water supply eliminated. The tower will then operate under normal conditions until the hydrochloric acid concentration has again been built up to such a point that it is desirable to cause its reduction. The bleeding operation will then be started once more.

It will be understood that the apparatus in accordance with this invention comprises essentially the usual apparatus for the production of nitric acid from ammonia, including an absorption column which, in accordance with this invention, is provided with an additional acid discharge line connected to the column at a point where the nitric acid concentration is within about the range 24 to 28 per cent.; and that the method in accordance with this invention comprises essentially the bleeding from the absorption column during absorption of a weak nitric acid containing the maximum concentration of hydrochloric acid produced during absorption.

In accordance with this invention, the necessity for periodic complete interruption of the absorption process for the removal of hydrochloric acid from the tower is eliminated. The effect of such interruptions, in addition to the delay thereby caused, was to produce severe flaking and scaling within the heat exchangers, condensers and converter due to the rapid temperature changes involved. At times such scaling effected great damage through the poisoning of the oxidation catalyst. In addition to the elimination of the necessity for this shutdown, the method in accordance with this invention necessitates the production of a much smaller quantity of weak nitric acid and also effects the production of a stronger nitric acid, all without substantial interruption of normal operation.

What I claim and desire to protect by Letters Patent is:

1. In apparatus for the production of nitric acid, an absorption column for the absorption of a nitrogen dioxide-containing gas in water and a discharge line leading therefrom, said discharge line being connected to the absorption column at a point at which the nitric acid concentration within said column is within the range of from about 24% to about 28%.

2. In apparatus for the production of nitric acid, an absorption column for the absorption of a nitrogen dioxide-containing gas in water and means connected to said column at a point at which the nitric acid concentration within said column is within the range of from about 24% to about 28% for discharging weak nitric acid from said column.

3. In apparatus for the production of nitric acid, an absorption column for the absorption of a nitrogen dioxide-containing gas in water, a water inlet at the top thereof, an outlet for concentrated nitric acid at the bottom thereof, and a discharge line connected thereto at a point approximately 15/40 of the distance from said nitric acid outlet to said water inlet for the discharge of weak nitric acid of a concentration within the range of from about 24% to about 28% from said column.

4. In the method for the production of nitric acid which includes the absorption of a nitrogen dioxide-containing gas in water containing a chloride dissolved therein, the step of removing from the absorption zone during absorption a weak nitric acid containing hydrochloric acid dissolved therein.

5. In the method for the production of nitric acid which includes the absorption of a nitrogen dioxide-containing gas in water containing a chloride dissolved therein, the step of removing from the absorption zone during absorption a weak nitric acid containing hydrochloric acid dissolved therein, the weak nitric acid being of a concentration such that the concentration of hydrochloric acid dissolved therein is substantially the maximum concentration of hydrochloric acid occurring in the absorption zone.

6. In the method for the production of nitric acid which includes the absorption of a nitrogen dioxide-containing gas in water containing a chloride dissolved therein, the step of removing from the absorption zone during absorption a weak nitric acid containing hydrochloric acid dissolved therein, the weak nitric acid having a concentration of from about 24% to about 28%.

7. The method for the production of nitric acid which includes passing a nitrogen dioxide-containing gas through an absorption column in counterflow to water containing a chloride dissolved therein, discharging a concentrated nitric acid from the bottom of said column, and discharging a weak nitric acid containing hydrochloric acid dissolved therein from an intermediate section of said column.

8. The method for the production of nitric acid which includes passing a nitrogen dioxide-containing gas through an absorption column in counterflow to water containing a chloride dissolved therein, discharging nitric acid having a concentration of about 65% from the bottom of said column, and discharging nitric acid having a concentration of from about 24% to about 28% from an intermediate section of said column.

9. The method for the production of nitric acid which includes passing a nitrogen dioxide-containing gas through an absorption column in counterflow to water containing a chloride dissolved therein, discharging a concentrated nitric acid from the bottom of said column, and discharging nitric acid having a concentration of from about 24% to about 28% from an intermediate section of said column.

10. The method for the production of nitric acid which includes passing a nitrogen dioxide-containing gas through an absorption column under superatmospheric pressure in counterflow to water containing a chloride dissolved therein, discharging a concentrated nitric acid from the bottom of said column, and discharging a weak nitric acid containing hydrochloric acid dissolved therein from an intermediate section of said column.

11. The method for the production of nitric acid which includes passing a nitrogen dioxide-containing gas under superatmospheric pressure through an absorption column in counterflow to water containing a chloride dissolved therein, discharging a concentrated nitric acid from the bottom of said column, and discharging nitric acid having a concentration of from about 24% to about 28% from an intermediate section of said column.

ORMOND J. CHINNOCK.